United States Patent
Sato et al.

(10) Patent No.: US 6,594,770 B1
(45) Date of Patent: Jul. 15, 2003

(54) SEMICONDUCTOR INTEGRATED CIRCUIT DEVICE

(75) Inventors: Yasuharu Sato, Kawasaki (JP); Kenichi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/449,642

(22) Filed: Nov. 30, 1999

(30) Foreign Application Priority Data

Nov. 30, 1998 (JP) ............................................ 10-340555

(51) Int. Cl.[7] .............................. G06F 1/32; G06F 1/26
(52) U.S. Cl. ........................ 713/320; 713/300; 713/310
(58) Field of Search ................................ 713/320, 300, 713/310, 322, 324; 711/4

(56) References Cited

U.S. PATENT DOCUMENTS

| | | | | |
|---|---|---|---|---|
| 4,509,148 A | * | 4/1985 | Asano et al. | 326/107 |
| 5,602,798 A | * | 2/1997 | Sato et al. | 365/194 |
| 5,696,729 A | * | 12/1997 | Kitamura | 326/62 |
| 5,926,434 A | * | 7/1999 | Mori | 365/193 |
| 6,088,290 A | * | 7/2000 | Ohtake et al. | 365/189.05 |

FOREIGN PATENT DOCUMENTS

| | | | |
|---|---|---|---|
| JP | 7-230688 | 8/1995 | |
| JP | 08329680 A | * 12/1996 | ........... G11C/11/41 |

OTHER PUBLICATIONS

IBM, Chip Select Circuit for Multi–Chip RAM Modules, Dec. 1, 1984, IBM Technical Disclosure Bulletin, vol. 27, pp. 3932–3934.*

* cited by examiner

Primary Examiner—Thomas Lee
Assistant Examiner—Suresh K Suryawanshi
(74) Attorney, Agent, or Firm—Arent Fox Kintner Plotkin & Kahn

(57) ABSTRACT

A semiconductor integrated circuit device includes a power-down generating circuit which generates a power-down control signal in response to a power-down signal externally supplied, a clock generating circuit which receives an external clock for generating internal clocks and is inactivated in response to the power-down signal, a chip select circuit which generates an input enable signal in response to a chip select signal externally supplied and is inactivated in response to the power-down signal, and an input circuit which receives an input signal externally supplied in synchronism with an internal clock.

15 Claims, 17 Drawing Sheets

F I G. 5
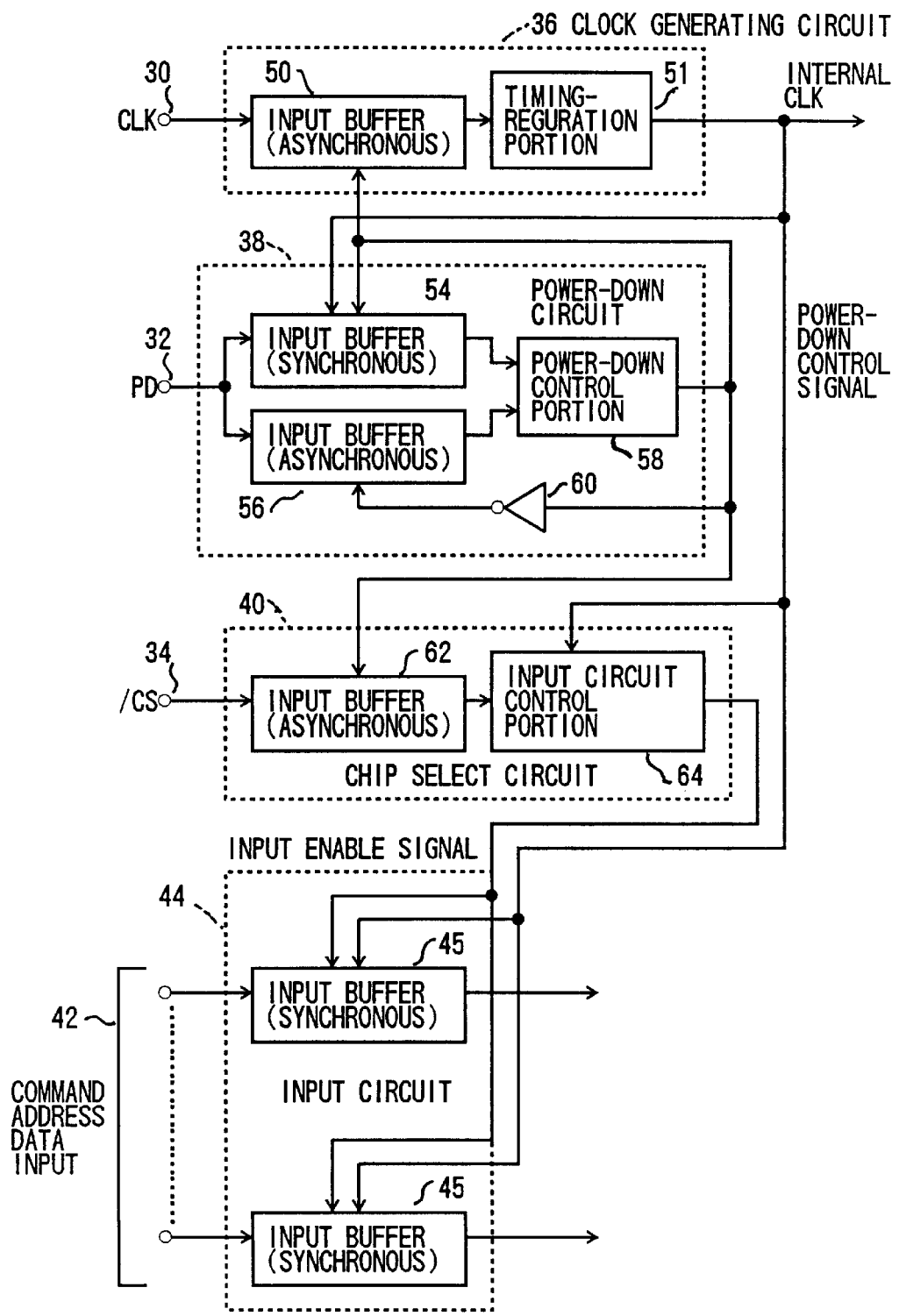

HIGH-SPEED CLK

DIFFERENCIAL CLK

USING UP-EDGE AND DOWN-EDGE

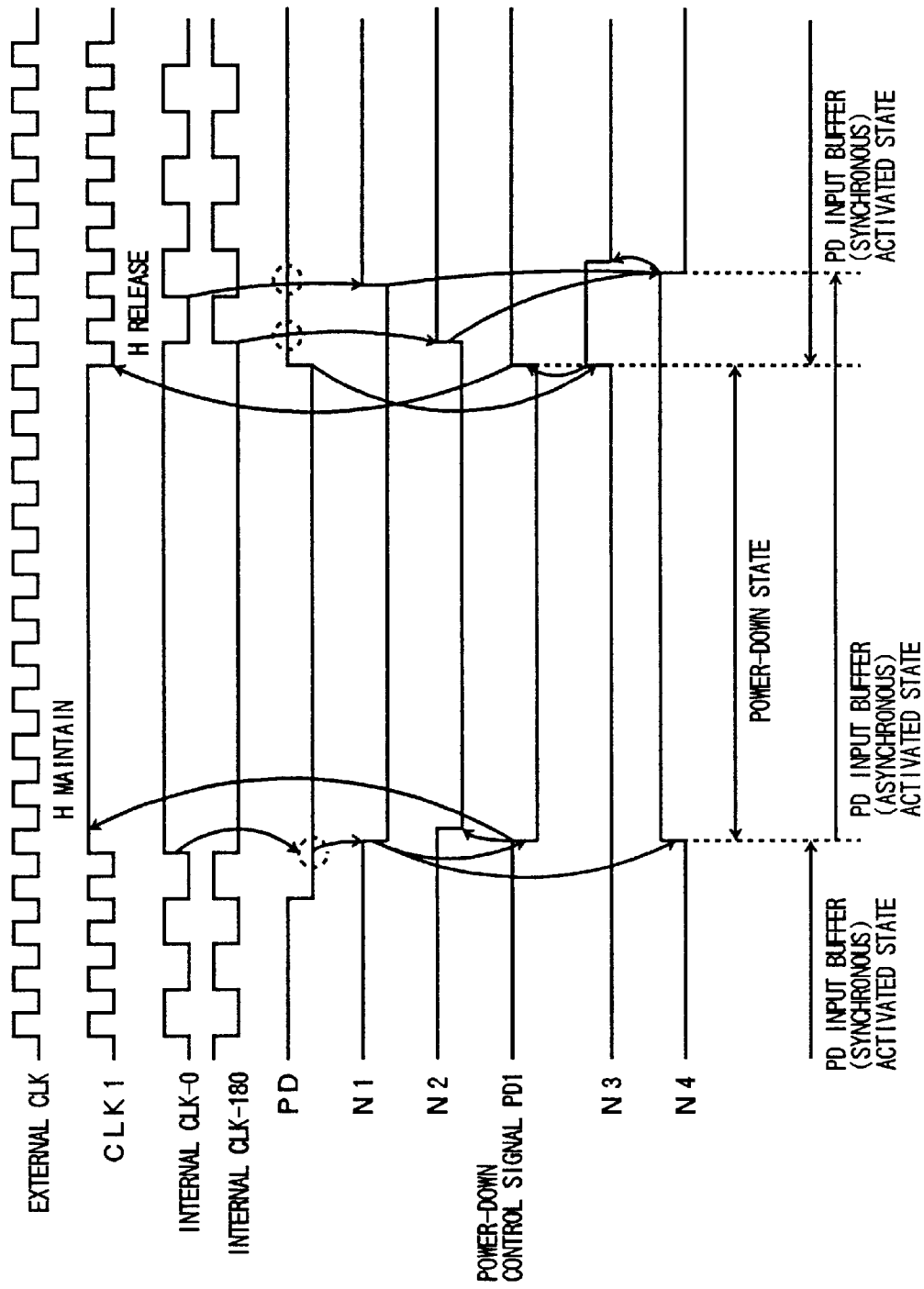

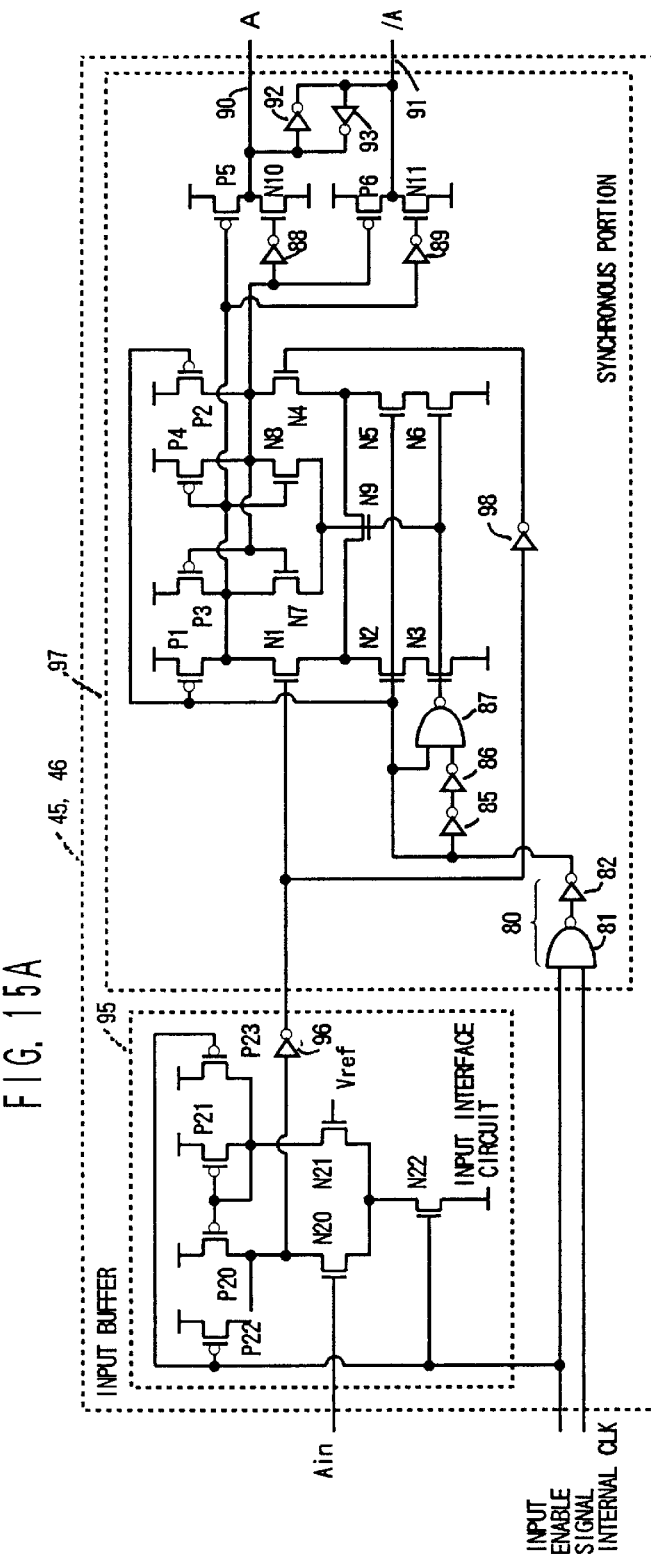
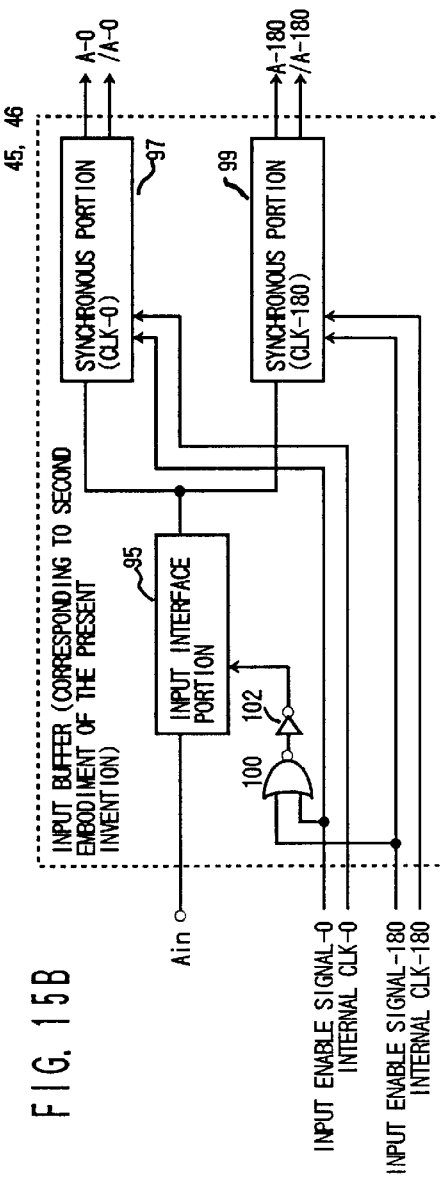
FIG. 15A
FIG. 15B

SEMICONDUCTOR INTEGRATED CIRCUIT DEVICE

BACKGROUND OF THE INVENTION

1. Field of the Invention

The present invention relates to semiconductor integrated circuit devices, and more particularly to a semiconductor integrated circuit device in which input circuits thereof can consume less power.

Recently, data transfer rates have been increased year by year because of the development of high-speed CPUs. In order to support the increased rates, there is a trend to broaden the width of data buses so that the number of the input circuits can be increased. For this reason, it is required to prevent the input circuits, which are not supplied with input signals and should not be activated, from consuming unnecessary power as much as possible.

2. Description of the Related Art

FIG. 1 and FIGS. 2A and 2B are block diagrams showing two examples of a conventional semiconductor integrated circuit device.

As shown in FIG. 1, a clock CLK, a clock enable signal CKE and a chip select signal CS are externally applied to a clock generating circuit 10, input buffers 12 and 14, respectively. A command signal, an address signal and a data signal are externally applied to input circuits 16, 18 and 20, respectively. When the clock enable signal CKE is maintained at a low level, the clock generating circuit 10 takes the clock CLK therein to generate an internal clock CLK and supply it to the input buffer 14 and the input circuits 16, 18 and 20, respectively. These circuits are thereby activated to be available to operate.

A timing-regulation portion within the clock generating circuit 10 may be, for example, a DLL (Delay Locked Loop) circuit. A command outputted from the input circuit 16 is applied to a command decoder 22.

As shown in FIG. 2A, the input circuits 14, 16, 18 and 20 each include an input interface portion 22 and a synchronous portion 23 which are shown in FIG. 2B. The input interface portion 22 is supplied with the clock enable signal CKE from the input buffer 12 so as to perform activation control.

FIG. 3 shows a timing chart of the signals at the time of a read operation according to the conventional device. FIG. 4 shows a timing chart of the signals at the time of a write operation according to the conventional device.

In the conventional device, the input circuits 16, 18 and 20 is activated during a low-level period of the clock enable signal CKE as shown in FIGS. 3 and 4. In fact, it is desired that these input circuits 16, 18 and 20 are activated only when the chip select signal CS is maintained at the low level. Hence, there is a problem in the conventional device that the period during which the input circuits 16, 18 and 20 are activated is too long, and as a result, the input circuits 16, 18 and 20 consume unnecessary power.

Further, in the conventional devices, the activation of the input circuits 16, 18 and 20 is performed in synchronism with that of the clock generating circuit 10. For this reason, in a case where the clock generating circuit 10 needs to be activated so as to activate, for example, output circuits (not shown), once the clock generating circuit 10 is activated, the input circuits 16, 18 and 20 are synchronously activated even if there is no command signal, address signal or data input signal taken therein. Hence, there is a problem in the conventional device that the input circuits 16, 18 and 20 are unnecessarily activated in such a case, and as a result unnecessary power is consumed.

SUMMARY OF THE INVENTION

It is a general object of the present invention to provide a semiconductor integrated circuit device in which the above problems are eliminated.

A more specific object of the present invention is to provide a semiconductor integrated circuit device in which input circuits thereof consumes less power.

The above objects of the present invention are achieved by a semiconductor integrated circuit device comprising: a power-down generating circuit for generating a power-down control signal in response to a power-down signal supplied externally; a clock generating circuit receiving an external clock for generating internal clocks and being inactivated in response to the power-down control signal; a chip select circuit for generating an input enable signal in response to a chip select signal externally supplied and being inactivated in response to the power-down control signal; and an input circuit receiving input signals supplied externally in synchronism with the internal clock activation and inactivation of said input circuit being controlled in response to the input enable signal and the power-down control signal.

Accordingly, since the input signal externally supplied is received in synchronism with the internal clock based on the input enable signal and the power-down control signal, even during the time of the power-down control signal indicating the power-on, the input circuit can be inactivated by the input enable signal. Hence, the power consumption can be reduced.

BRIEF DESCRIPTION OF THE DRAWINGS

Other objects, features and advantages of the present invention will become more apparent from the following detailed description when read in conjunction with the accompanying drawings, in which:

FIG. 5 is a block diagram of a first embodiment of a semiconductor integrated circuit device according to the present invention;

FIG. 13 is a signal timing chart for illustrating the operation of FIGS. 12A and 12B;

FIG. 15A is a circuit diagram of a second embodiment of the synchronous input buffer, and FIG. 15B is a block diagram o the second embodiment of the synchronous input buffers;

DETAILED DESCRIPTION OF THE PREFERRED EMBODIMENTS

Figure 1:
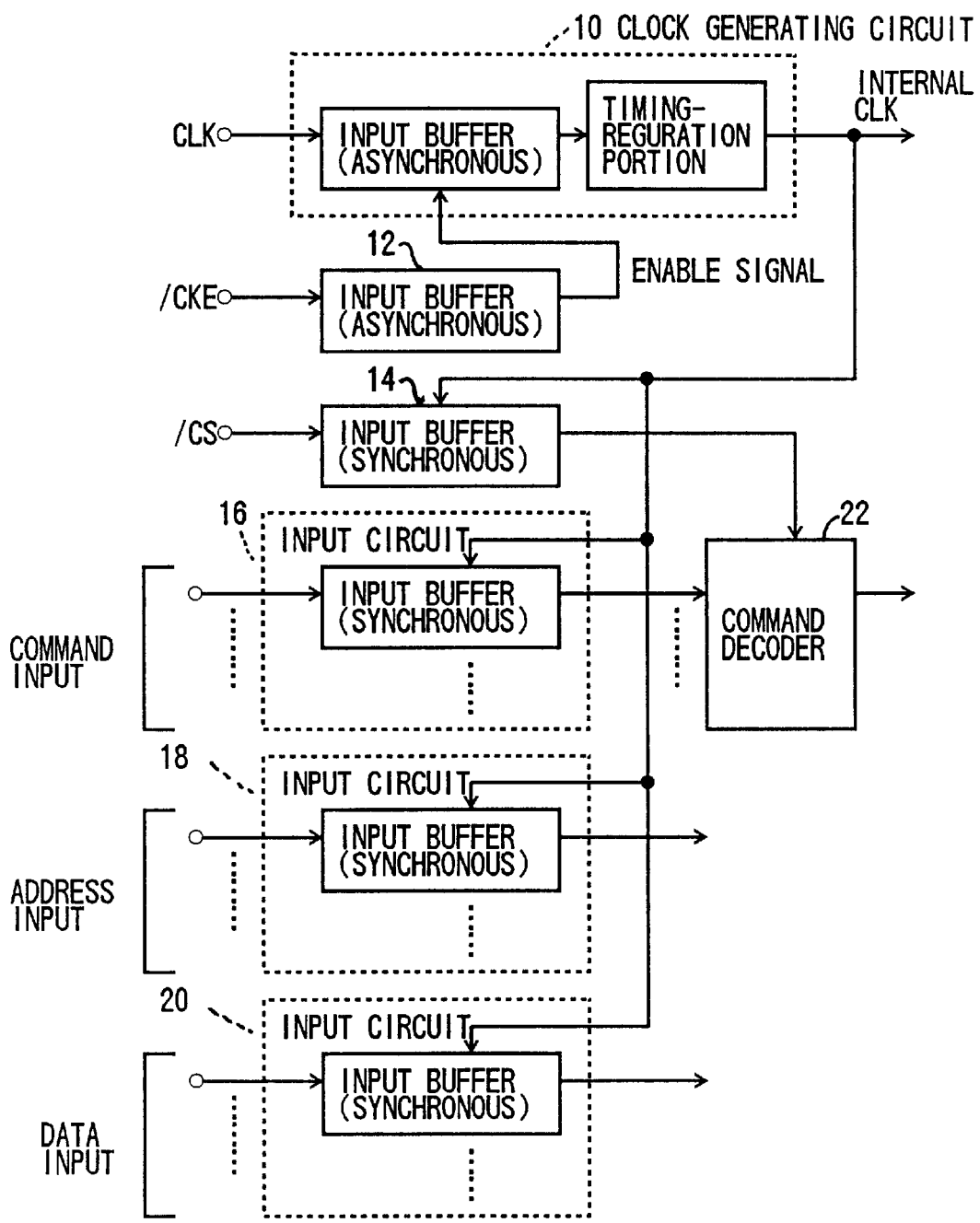
FIG. 1 is a block diagram showing an example of a conventional semiconductor integrated circuit device.
Figure 2:
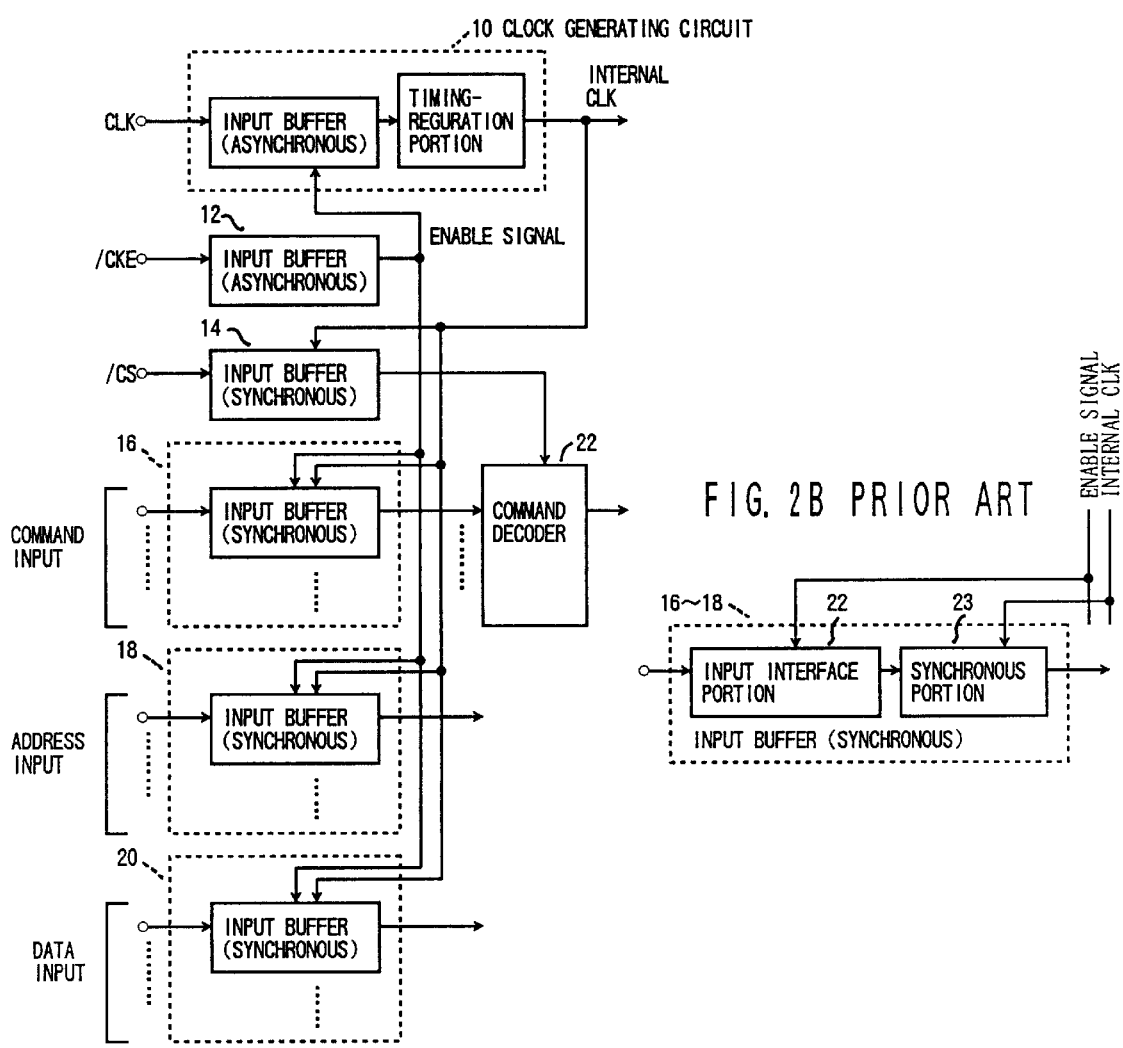
FIG. 2 is a block diagram showing another example of the conventional semiconductor integrated circuit device.
Figure 3:
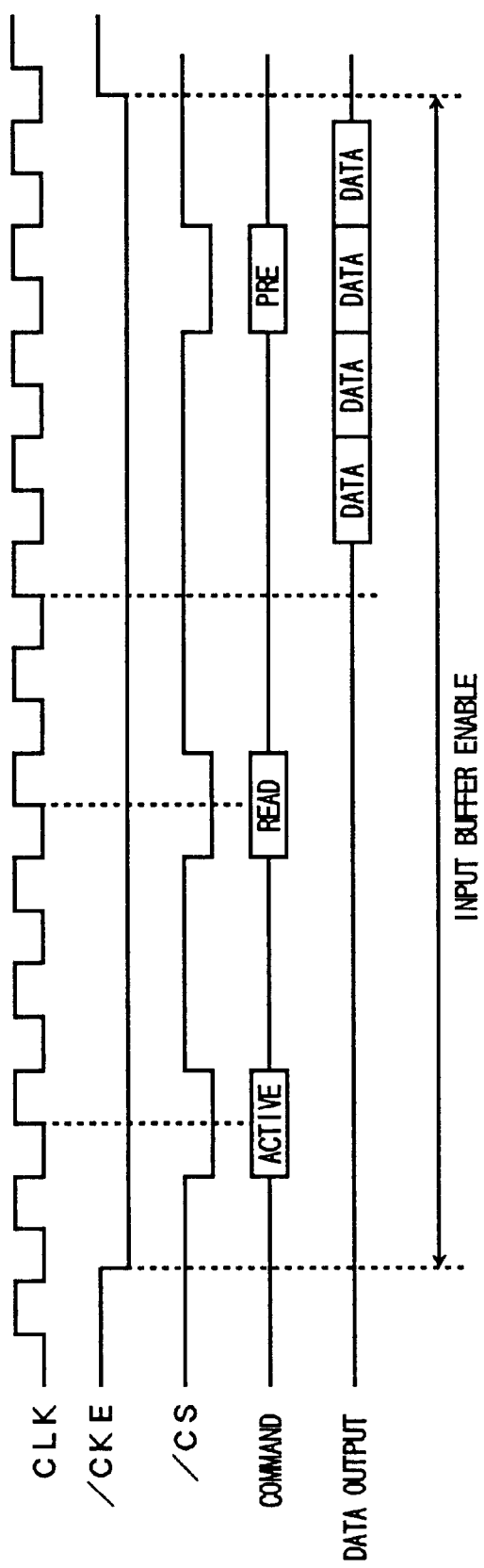
FIG. 3 is a timing chart of signals at the time of a read opera on in the conventional semiconductor in rated circuit device.
Figure 4:
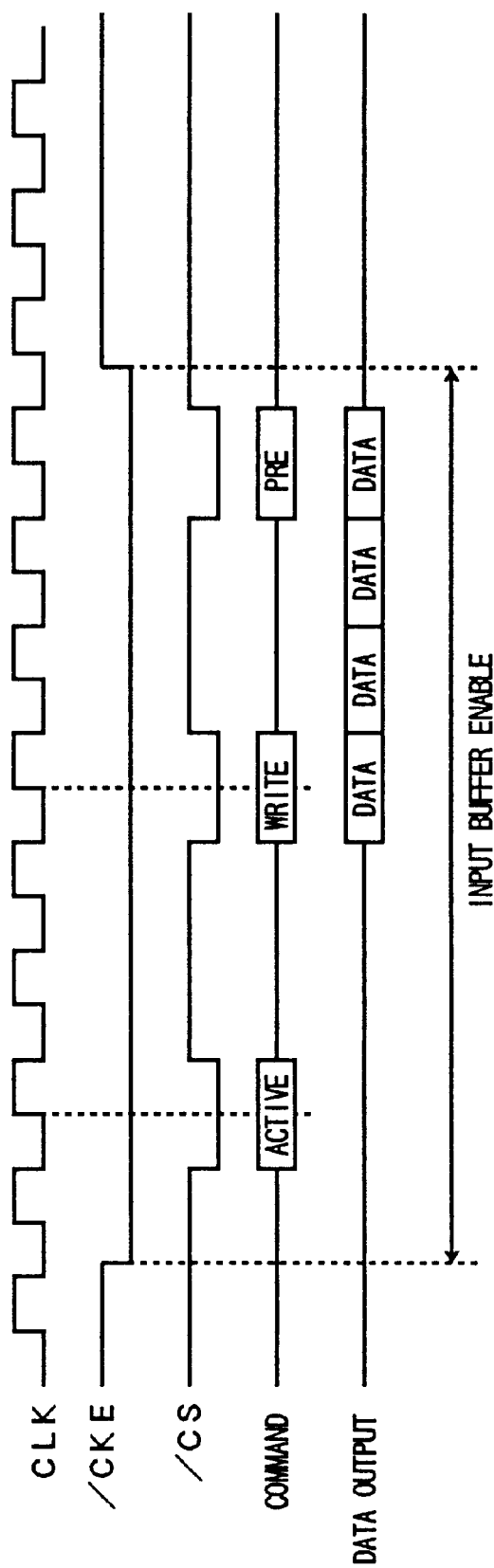
FIG. 4 is a timing chart of the signals at the time of a write operation in the conventional semiconductor interated circuit device.

A description will now be given of a first embodiment of the present invention.

FIG. 5 is a block diagram for illustrating a semiconductor integrated circuit device of the first embodiment of according to the present invention. This diagram shows an input portion of a synchronous-dynamic-random-access memory (hereinafter simply referred to as SDRAM). In the input portion of the SDRAM, a clock CLK, a power-down signal PD and a chip select signal CS from external terminals 30, 32 and 34 are applied to a clock generating circuit 36, a power-down circuit 38 and a chip select circuit 40, respectively. In addition, N-bit signals such as a command signal, an address signal, a data signal and the like are applied to an input circuit 44 from an external terminal 42.

The clock generating circuit 36 consists of an asynchronous input buffer 50 and a timing-regulation portion 51. The input buffer 50 is set in an inactivated state when the power-down control signal supplied from the power-down circuit 38 is maintained at the low level, and is set in an activated state when the power-down control signal at the high level. The timing-regulation portion 51 may be, for example, the DLL (Delay Locked Loop) circuit. The clock generating circuit 36 generates an internal clock based on the external clock when the input buffer 50 operates and then feeds the internal clock to the power-down circuit 38, the chip-select circuit 40, and the input circuit 44.

The power-down circuit 38 consists of a synchronous input buffer 54, an asynchronous input buffer 56, a power-down control portion 58 and an inverter 60. When the power-down signal PD from the external terminal 32 is maintained at the low level as an indication of the power-down, a high-level output from the power-down control portion 58 is applied to the input buffer 54 and via the inverter 60 applied to the asynchronous input buffer 56. As a result, the synchronous input buffer 54, which consumes more power, is set in the inactivated state by the high-level output (which serves as the power-down control signal) of the power-down control portion 58, whereas the asynchronous input buffer 56, which consumes less power, is set in the activated state.

On the other hand, when the power-down signal PD is maintained at the high level as an indication of power-on, the output of the input buffer 56 causes the output (which serves as the power-down control signal) of the power-down control portion 58 to be maintained at the low level. As a result, the asynchronous input buffer 56 consuming less power is set in the inactivated state, whereas the synchronous input buffer 54 consuming more power is set in the activated state. The output of the power-down control portion 58 as the power-down control signal is fed to the other circuits as shown in FIG. 5.

The chip select circuit 40 consists of an asynchronous input buffer 62 and an input-circuit control portion 64. The input buffer 62 is supplied with the chip select signal CS from the external terminal 34 and the power-down control signal from the power-down circuit 38. According to the chip select signal CS from the input buffer 62, the input-circuit control portion 64 in its power-on switches between a falling edge and a rising edge of the internal clock CLK so as to generate an input enable signal. The input enable signal serves to indicate an enable at the high level and is applied to the input circuit 44.

The input circuit 44 consists of a plurality of synchronous input buffers 45, the number of which is equal to N which may be any number. These input buffers 45 are supplied with the internal clock from the clock generating circuit 36 and the input enable signal from the chip select circuit 40, respectively. When the power-down control signal is maintained at the low level and the input enable signal is maintained at the high level, these input buffers 45 are set in the activated states and feed the signals from the external terminal 42 to internal circuits (not shown) to be described later.

Figure 6:
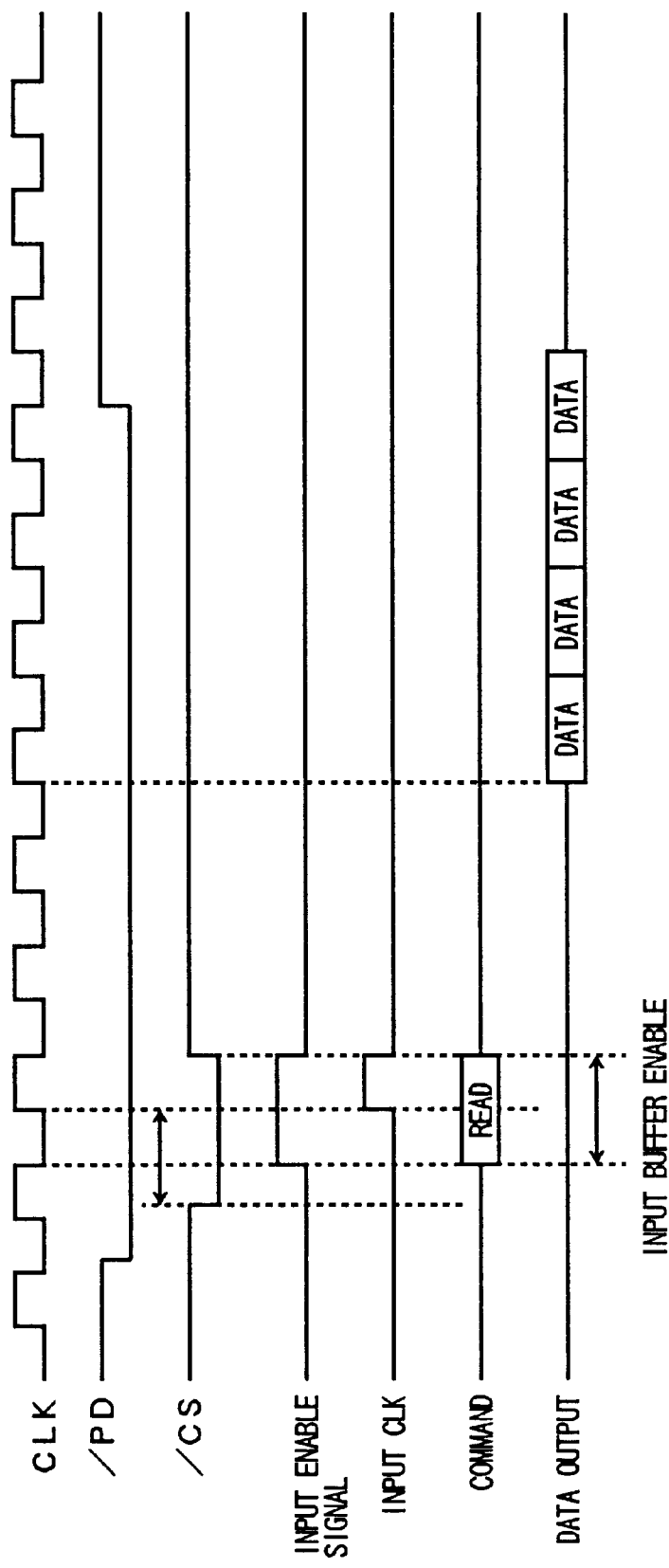
FIG. 6 is a timing chart of signals at the time of a read operation in the semiconductor integrated circuit device according to the present invention.
Figure 7:
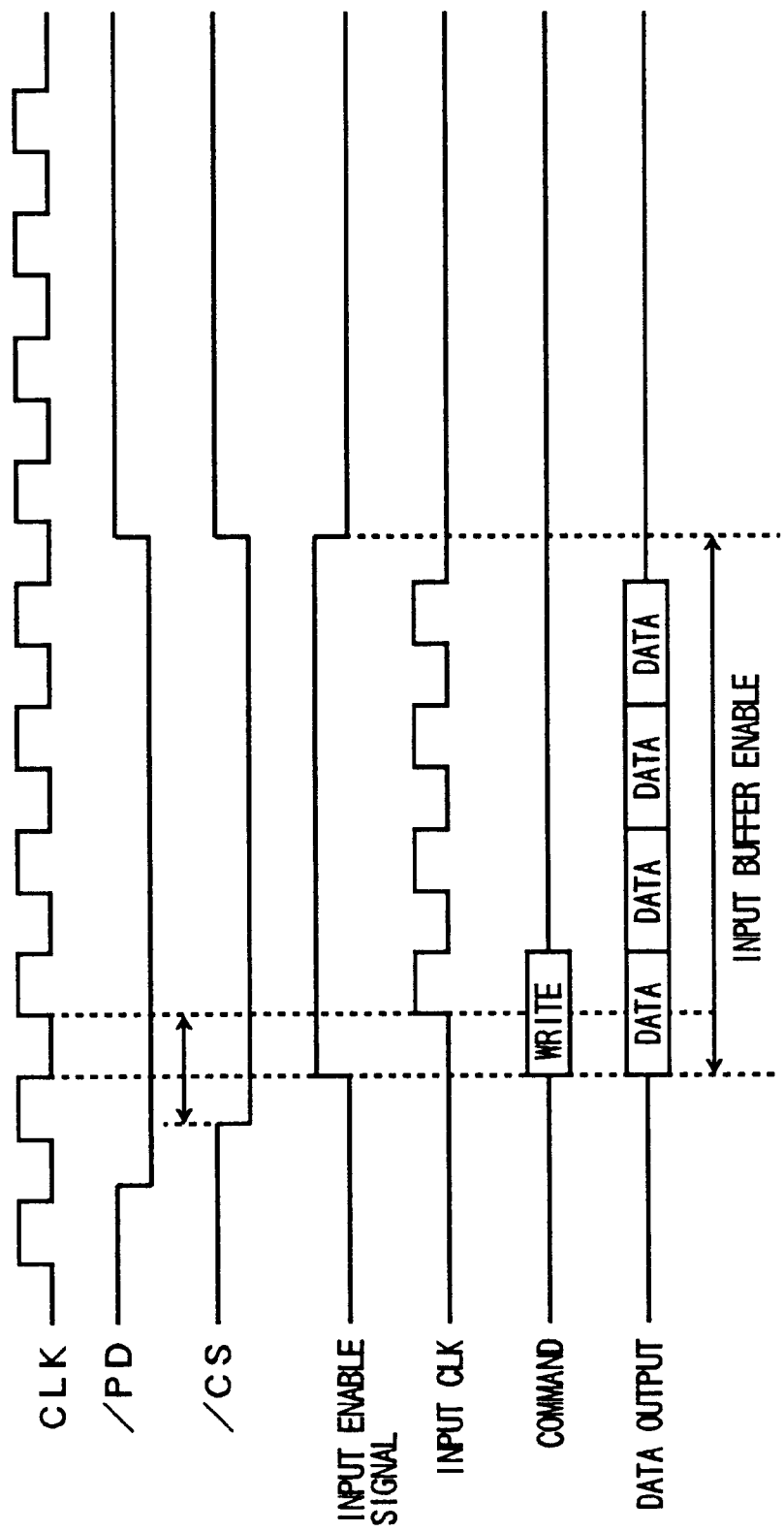
FIG. 7 a timing chart of the signals at the time of a write operation in the semiconductor integrated circuit device according to the present invention.

FIG. 6 shows a timing chart of the signals at the time of the read operation in the semiconductor integrated circuit device according to the present invention. FIG. 7 shows a timing chart of the signals at the time of the write operation in the same device according to the present invention. In addition, FIGS. 6 and 7 show an inverted signal /PD ("/" means an active-low signal) of the power-down signal PD.

Herein, the input-circuit control portion 64 switches between the falling edge and the rising edge of the internal clock CLK so as to generate the input enable signal which indicates the enable at the high level. Therefore, immediately before the input circuit 44 takes the input signals therein, the input-circuit control portion 64 takes a predetermined time (may be equal to or less than a clock cycle) enough to enable the input enable signal. As a result, the period can be reduced during which the input circuit 44 is set in the activated state, and the power consumption of the input circuit 44 can be thereby drastically reduced.

Also, even in a case where a supply/non-supply of the internal clock to the input circuit 44 is frequently carried out, the internal clock with a broken waveform can be prevented from being fed to the input circuit 44. In a case where the input circuit 44 includes an asynchronous circuit portion for an interface, the asynchronous circuit portion is also supplied with the input enable signal so that the activation control can be preformed and the unnecessary power consumption can be reduced.

Figure 8:
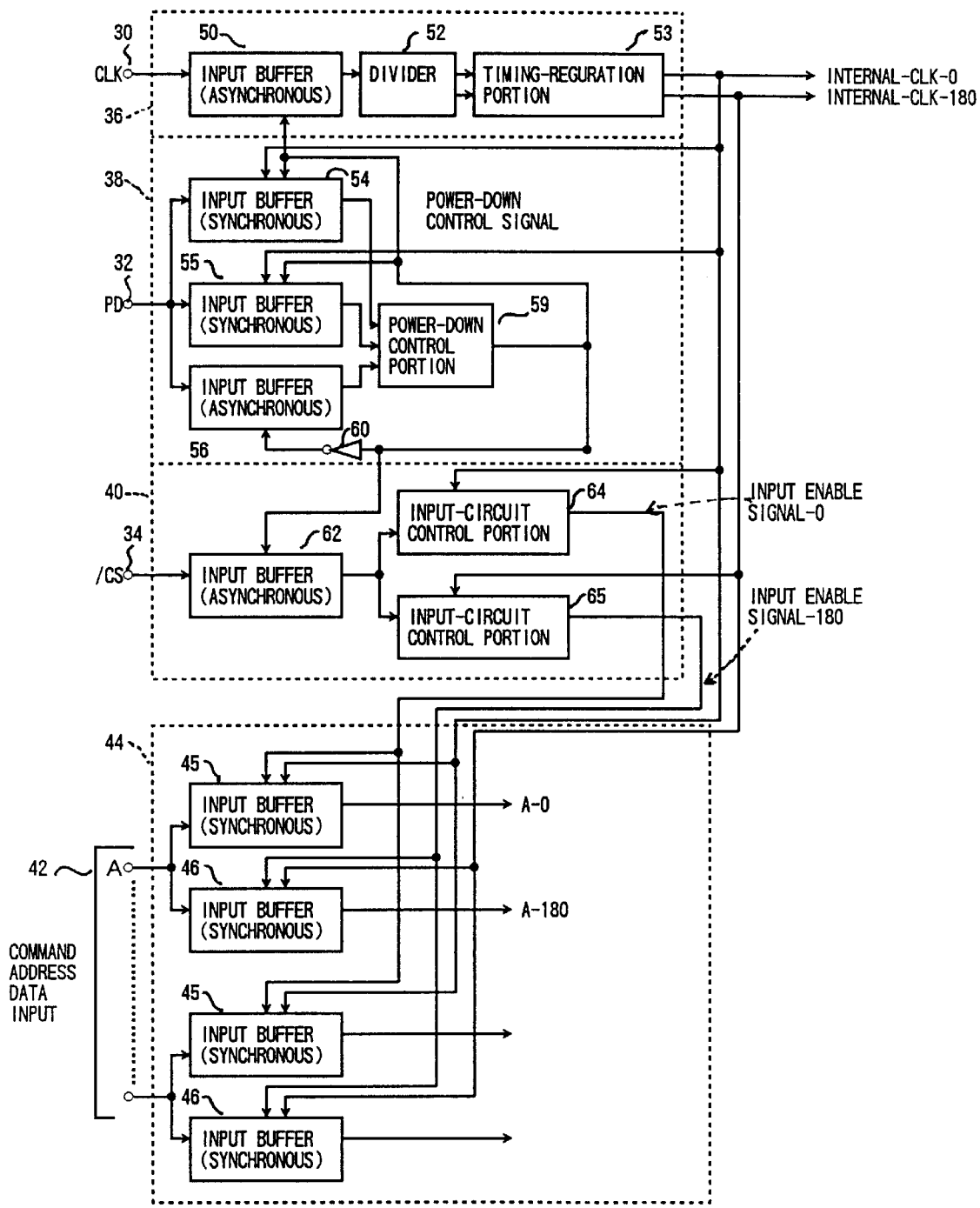
FIG. 8 is a block diagram of a second embodiment of the semiconductor integrated circuit device according to the present invention.

FIG. 8 is a block diagram of a second embodiment of the semiconductor integrated circuit device according to the present invention. This diagram shows an input portion of the SDRAM. In the second embodiment, since a frequency of the internal clock is reduced in half with respect to that of the external clock, it is possible to increase an external data transfer rate while lowly controlling an operating frequency inside the device. As shown in FIG. 8, parts that are the same as those shown in FIG. 5 are given the same reference numerals.

As shown in FIG. 8, the clock CLK, the power-down signal PD and the chip select signal CS from the external terminals 30, 32 and 34 are applied to the clock generating circuit 36, the power-down circuit 38 and the chip select circuit 40, respectively. The N-bit signals such as the command signal, the address signal, the data signal and so on from the external terminal 42 are applied to the input circuit 44.

The clock generating circuit 36 consists of the asynchronous input buffer 50, a frequency divider 52 and a timing-regulation portion 53. The input buffer 50 is set in the inactivated/activated state when the power-down control signal supplied from the power-down circuit 38 is maintained at the low/high level. The frequency divider 52 divides the frequency of the external clock into half so as to generate two clocks which are in a phase shift of 180° and feed them to the timing-regulation portion 53. The timing-regulation portion 53 may be, for example, the DLL (Delay Locked Loop) circuit, which delays the two clocks so as to output two internal clocks CLK-0 and CLK-180 (first and second internal clocks) which are in the phase shift of 180°. The two internal clocks CLK-0 and CLK-180, which are generated based on the external clock CLK when the input buffer 50 operates in the clock generating circuit 36, are applied to the other circuits as shown in FIG. 8.

The power-down circuit 38 consists of the synchronous input buffers 54 and 55, the asynchronous input buffer 56, a power-down control portion 59 and the inverter 60. The synchronous input buffer 54 is fed with the internal clock CLK-0, whereas the synchronous input buffer 55 is fed with the internal clock CLK-180. When the power-down signal PD from the external terminal 32 indicates the power-down at the low level, a high-level output of the power-down control portion 59 is applied to the synchronous input buffers 54 and 55, and is, via the inverter 60, applied to the asynchronous input buffer 56.

As a result, the asynchronous input buffer 56, which consumes less power, is set in the activated state, whereas the synchronous input buffers 54 and 55, which consume more power, are set in the inactivated states by the high-level output (which serves as the power-down control signal) of the power-down control portion 59.

On the other hand, when the power-down signal PD is maintained at the high level to indicate the power-on, the output of the input buffer 56 causes the output of the power-down control portion 59 to be at the low level.

As a result, the asynchronous input buffer 56 consuming less power is set in the inactivated state, whereas the synchronous input buffers 54 and 55 consuming more power are set in the activated states. The output of the power-down control portion 59 as the power-down control signal is fed to the other circuits as shown in FIG. 8.

The chip select circuit 40 consists of the asynchronous input buffer 62, the input-circuit control portion 64 which is fed with the internal clock CLK-0, and the input-circuit control portion 65 which is fed with the internal clock CLK-180. The input buffer 62 is fed with the power-down control signal from the power-down circuit 38 as well as the chip select signal CS.

According to the chip select signal CS from the input buffer 62, the input-circuit control portion 64 in the power-on, switches between the falling edge and the rising edge of the internal clock CLK-0 so as to generate an input enable-0 signal (which is regarded as a first input enable signal) indicating an enable at the high level and supply it to the input buffers 45 of the input circuit 44.

Also, according to the chip select signal CS from the input buffer 62, the input-circuit control portion 65 in the power-on, switches between the falling edge and the rising edge of the internal clock CLK-180 so as to generate an input enable-180 signal (which is regarded as a second input enable signal) indicating the enable at the high level and supply it to input buffers 46 of the input circuit 44.

The number of the asynchronous input buffers 45 and 46 in the input circuit 44 may be 2*N, where "N" may indicate any number. The N input buffers 45 are each supplied with the internal clock CLK-0 and the input enable signal-0, whereas the N input buffers 46 are each supplied with the internal clock CLK-180 and the input enable signal-180. When the input enable signal-0 and the input enable signal-180 are maintained at the high level, these input buffers 45 and 46 are activated to supply the input signals from the external terminal 42 to internal circuits (not shown) to be described later.

Figure 9:
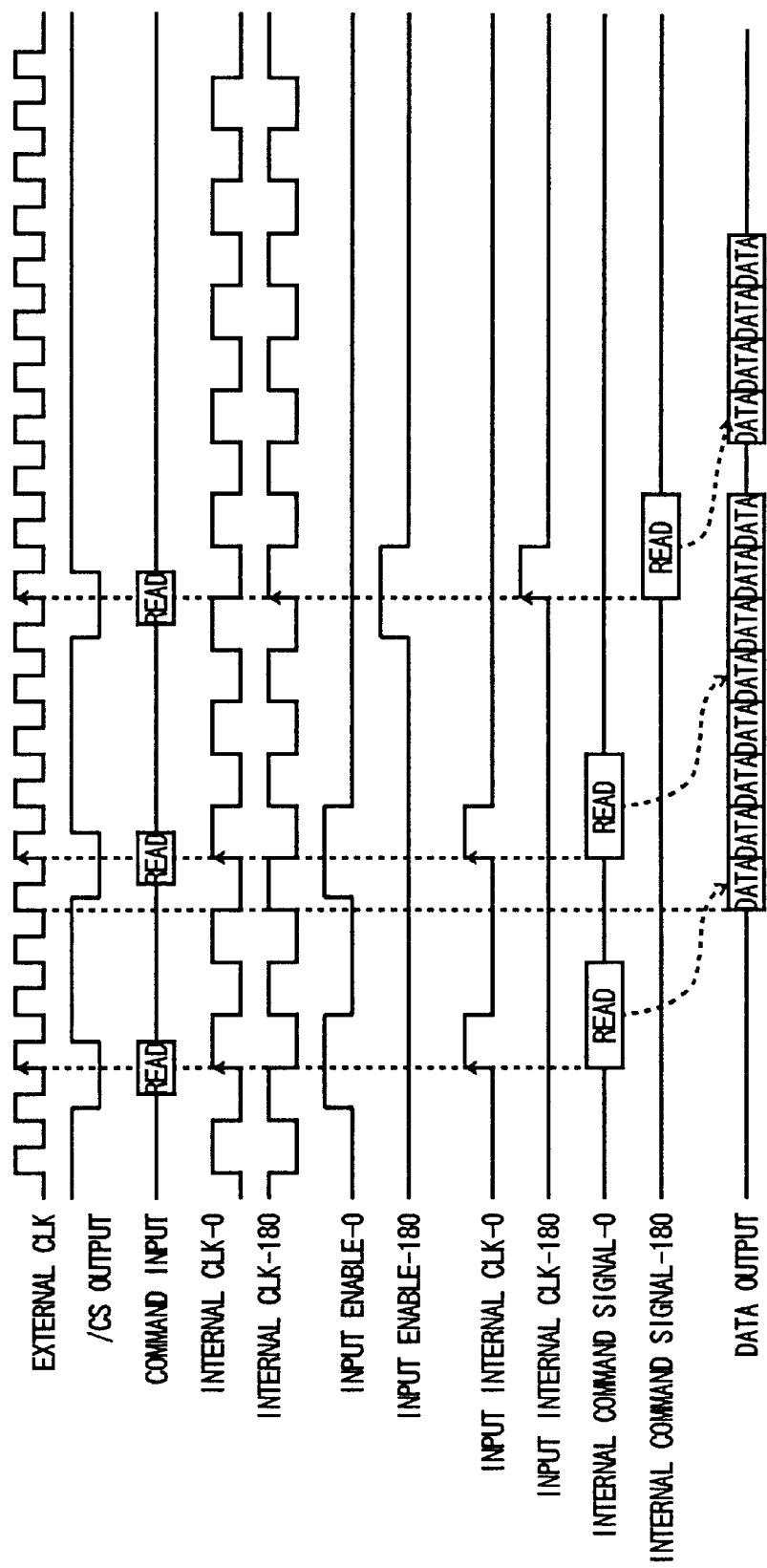
FIG. 9 is a timing chart of signals at the time of a read operation in the semiconductor integrated circuit device according to the present invention.
Figure 10:
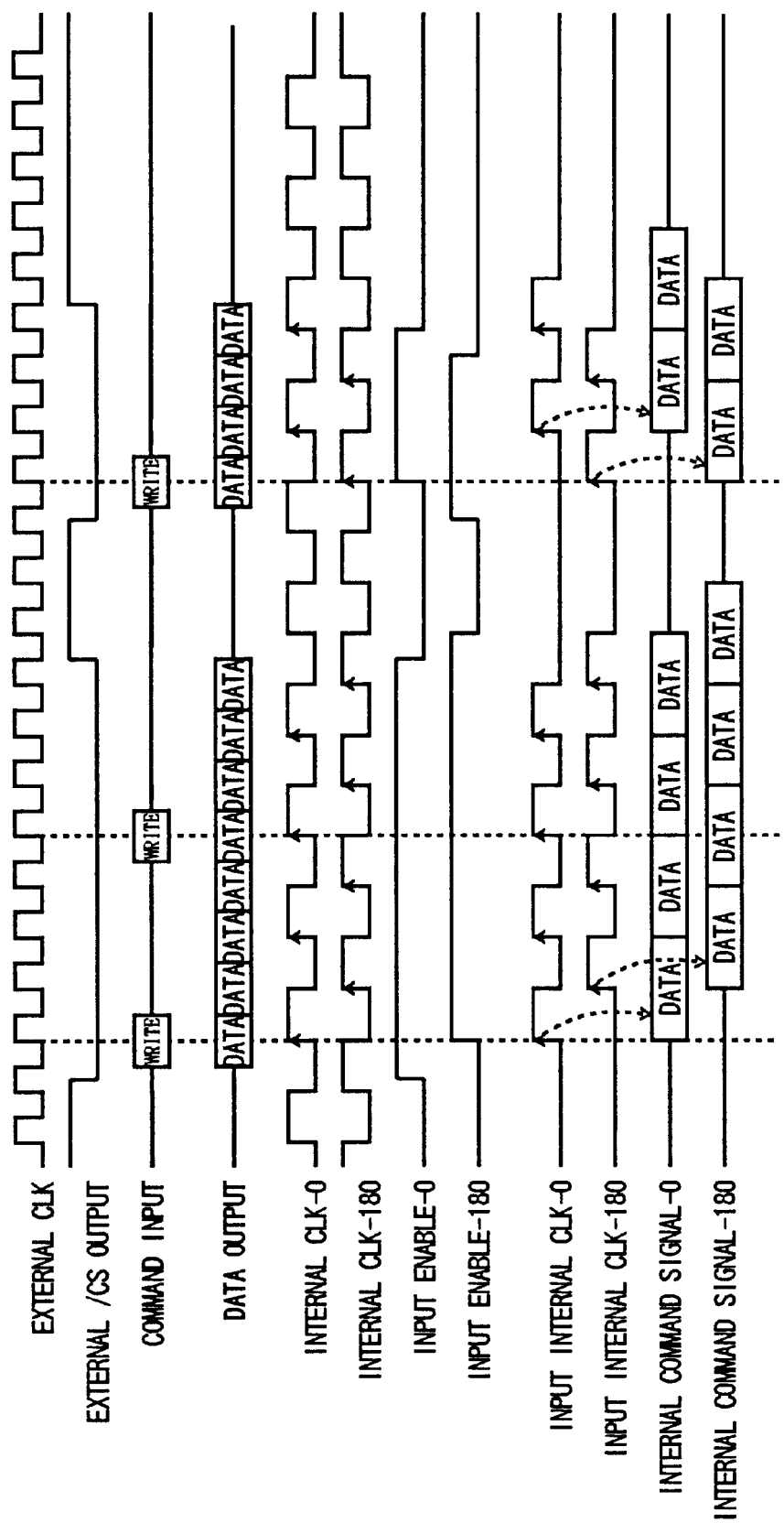
FIG. 10 is a timing chart of the signals at the time of a write operation in the semiconductor integrated circuit device according to the present invention.

FIG. 9 shows a timing chart of the signals at the time of the read operation in the semiconductor integrated circuit according to the present invention. FIG. 10 shows a timing chart of the signals at the time of the write operation in the semiconductor integrated circuit according to the present invention.

Herein, the input-circuit control portions 64 and 65 switch between the falling edges and the rising edges of the respective internal clock CLK-0 and CLK-180 so as to generate the input enable signal-0 and signal-180 which indicate the enable at the high level. Hence, it is possible for the input-circuit control portions 64 and 65 to take the predetermined time (may be equal to or less than a clock cycle) enough to enable the input enable signal-0 and signal-180 immediately before the input circuit 44 takes the input signals therein.

As a result, the period during which the input circuit 44 is set in the activated state can be reduced and thereby the power consumption of the input circuit 44 can be remarkably reduced.

Figure 11A:
FIG. 11 shows signal waveforms for illustrating an internal-clock generating method.
Figure 11B:
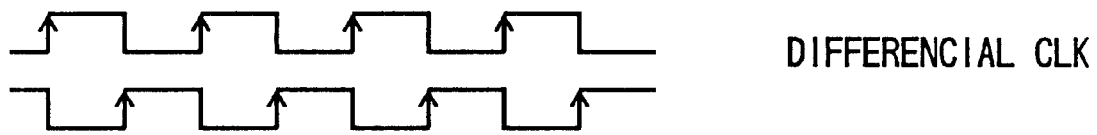
Figure 11C:

FIGS. 11A through 11C are three waveforms for illustrating an internal-clock generating method. As shown in FIG. 11A, the clock generating circuit 36 is supplied with an external clock (high-speed clock) from the external terminal 30 and divides the frequency of rising edges thereof so as to output two internal clocks CLK-0 and CLK-180. As shown in FIG. 11B, the clock generating circuit 36 is supplied with two complementary clocks which are in the phase shift of 180° and outputs them as the internal clocks CLK-0 and CLK-180. As shown in FIG. 11C, the clock generating circuit 36 is supplied with an external clock (low-speed clock) and shifts it so as to output the internal clocks CLK-0 and CLK-180.

Figure 12A:
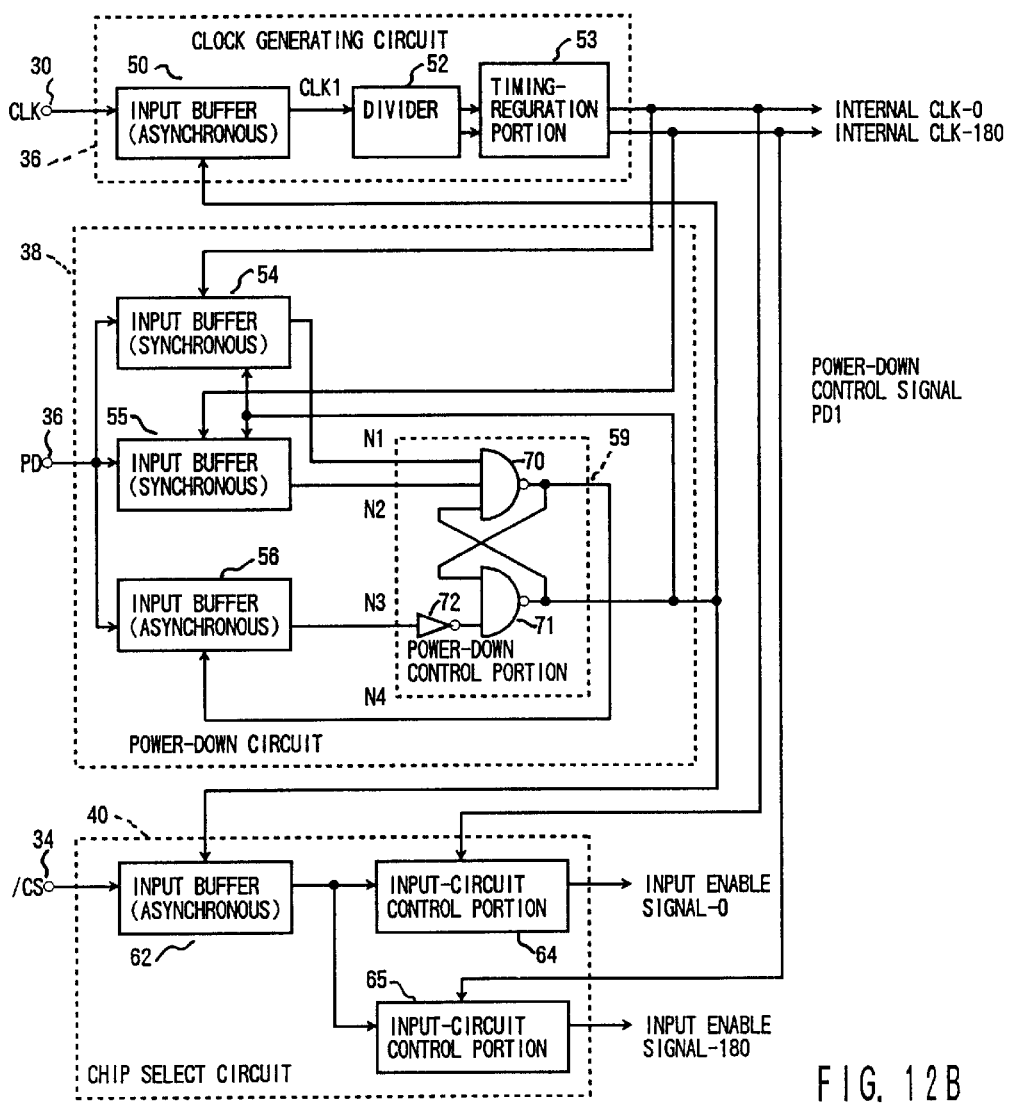
FIG. 12A is block diagram showing a power-down circuit 38 and a chip select circuit 40.
Figure 12B:
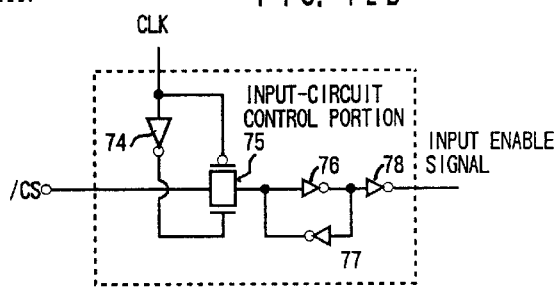
FIG. 12B is a circuit diagram of input-circuit control portions 64, 65.

Next, with respect to the power-down circuit 38 and the chip select circuit 40, a description will now be given with reference to FIGS. 12A and 12B and FIG. 13. A power-down control portion 59 shown in FIG. 12A consists of NAND circuits 70, 71 and an inverter 72. The NAND circuit 70 is supplied with outputs N1 and N2 respectively from the input buffers 54 and 55 and an output (which serves as the power-down control signal) from the NAND circuit 71. The NAND circuit 71 is supplied with an inverted signal which is generated in such a way that the inverter 72 inverts an output N3 from the input buffer 56, and with an output signal N4 (an inverted signal of the power-down control signal) from the NAND circuit 70. Since the output N4 of the NAND circuit 70 is the inverted signal of the power-down control signal, the inverter 60 is not used herein.

As shown in FIG. 13, when the power-down signal PD is maintained at the high level, the input buffers 54 and 55 are activated. When the power-down signal PD falls down, the signal N1 also falls down in synchronism with the internal clock CLK-0 and the power-down control signal PD1 is switched to the low level. According to the indication of the power-down, the input buffers 54 and 55 is set in the inactivated states, the input buffer 56 turns is set in the activated state, and the input buffer 50 of the clock generating circuit 36 is also set in the inactivated state.

Then, when the power-down signal PD rises up, the signal N3 rises up and the power-down control signal PD1 is switched to the high level. According to the indication of the power-on, the input buffer 50 of the clock generating circuit 36 and the input buffers 54, 55 are activated, and the signals N1 and N2 rise up in synchronism with the internal clocks CLK-0 and CLK-180.

Referring back to FIG. 12B, the input-circuit control portions 64 and 65 of the chip select circuit 40 each consist of a transmission gate 75, a latch loop of inverters 76 and 77, and an inverter 78. The transmission gate 75 has an inverter 74 which allows the chip select signal CS to pass it through when the internal clocks CLK-0 and CLK-180 are maintained at the low level. The latch loop of the inverter 76 and 77 is supplied with a signal from the transmission gate 75 and latches the signal. The inverter 78 inverts a latched signal and outputs a latched-and-inverted signal. In this manner, the chip select signal CS is outputted in synchronism with the respective internal clocks CLK-0 and CLK-180.

Figure 14:
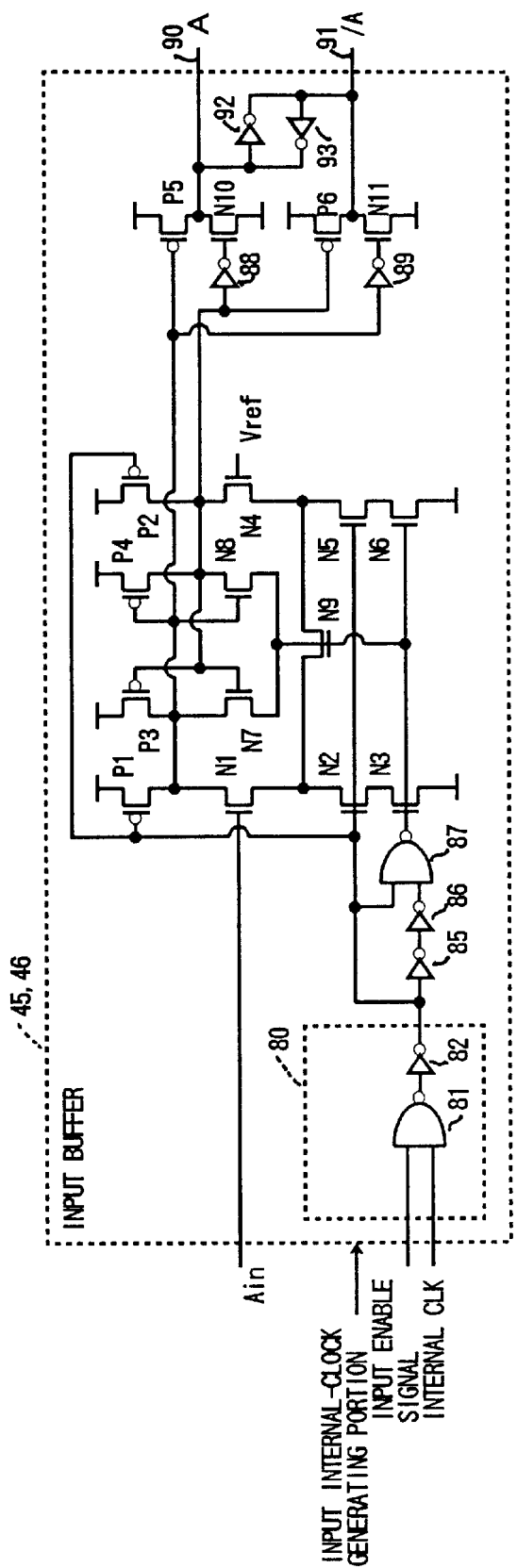
FIG. 14 is a circuit diagram of a first embodiment of a synchronous input buffer.

FIG. 14 is a circuit diagram of a first embodiment of the synchronous input buffers 45, 46 of the input circuit 44 and the input buffers 54 and 55. In this diagram, an input internal-clock generator 80 consists of a NAND gate 81 and an inverter 82, and is supplied with the internal clock CLK and the input enable signal so that the internal clock CLK is outputted as an input internal-clock when the input enable signal is maintained at the high level.

Inverters 85, 86 and a NAND gate 87 expand pulses from a rising edge of the input internal-clock and generate a time for turning on n-channel MOS (Metal Oxide Semiconductor) transistors N3, N6 and N9. A differential circuit consists of p-channel MOS transistors P1, P2 and n-channel MOS transistors N1 through N6. When an output pulse of the NAND gate 87 is maintained at its high level, the differential circuit compares an input signal Ain with a reference voltage Vref so as to perform a difference output. A latch loop by two inverters, which are constituted by p-channel MOS transistors P3, P4 and n-channel MOS transistors N7 through N9, latches the difference output so as to supply it to a tristate outputting portion, which is constituted by p-channel MOS transistors P5, P6 and n-channel MOS transistors N10, Nil and inverters 88, 89.

Thereafter, a signal A is outputted over a signal line 90 and an inverted signal /A is outputted over a signal line 91. Between the signal lines 90 and 91, there connected a latch loop of inverters 92 and 93.

In this manner, by generating the input internal-clock from the internal clock and the input enable signal, the input circuit can take in the input signals in synchronism with either of the rising edge or the falling edge of the internal clock.

FIG. 15A is a circuit diagram of a second embodiment in which the synchronous input buffers 45, 46 of the input circuit 44 and the input buffers 54, 55 each includes an input interface portion. In order to increase the operating frequency, the input interface portion is required to narrow the amplitude of an input signal supplied externally. In FIGS. 15A and 15B, parts that are the same as those of FIG. 14 are given the same reference numerals.

As shown in FIG. 15A, in an input interface portion 95, the p-channel MOS transistors P20, P21, which constitute a current mirror circuit, flow a direct current in the activated state so as to supply power to the n-channel MOS transistors N20, N21, which constitute a differential circuit. In a case where the input interface portion 95 is to be inactivated, the input enable signal is applied to the p-channel MOS transistors P22, P23 and n-channel MOS transistor N22 so that these transistors are turned off and the power of the input interface portion 95 is thus intercepted.

When the input enable signal is maintained at the high level, the input interface portion 95 compares the input signal Ain with the reference voltage Vref in the differential circuit to generate a comparison result. Then the comparison result is via an inverter 96 supplied, to the MOS transistor N1 of a synchronous portion 97 and further via an inverter 98 to the MOS transistor N4 of the same.

The input internal-clock generator 80, consisting of the NAND gate 81 and the inverter 82, is supplied with the internal clock CLK and the input enable signal so as to output the internal clock CLK as the input internal-clock when the input enable signal is maintained at the high level.

The inverters 85, 86 and the NAND gate 87 expand the pulses from the rising edge of the input internal-clock and generate the time for turning on the n-channel MOS transistors N3, N6 and N9. The p-channel MOS transistors P1, P2 and the n-channel MOS transistors N1 to N6 constitute a differential circuit, which compares the input signal Ain with an inverted input signal to perform a difference output when the pulse outputted from the NAND gate 87 is maintained at the high level.

Further, the p-channel MOS transistors P3 and the n-channel MOS transistors N7 and N9 constitute one inverter, while the p-channel MOS transistors P4 and the n-channel MOS transistors N8 and N9 constitute another inverter. A latch loop by the two inverters latches and feeds the difference output to the tristate outputting portion, which consists of the p-channel MOS transistors P5, P6 and the n-channel MOS transistors N10, N11 and inverters 88, 89.

Thereafter, the signal A is outputted over the signal line 90 and the inverted signal /A is outputted over the signal line 91. And between the signal lines 90 and 91, there is connected the latch loop of the inverters 92 and 93.

The above description with respect to FIG. 14 and FIG. 15A is used for illustrating the structure in a case of FIG. 5. FIG. 15B shows one embodiment of FIG. 8 in which the input buffers 45, 46, 54 and 55 each have the input interface portion.

As shown in FIG. 15B, the input interface portion 95 is supplied with the input enable signal-0 and input enable signal-180 as enable signals via an NOA gate 100 and an inverter 102. When the enable signals are maintained at the high level, the input interface portion 95 takes the input signal Ain therein and supplies it to the synchronous portions 97 and 99 which are the same in constitution. The synchronous portion 97 is supplied with the enable signal-0 and the internal clock CLK-0, whereas the synchronous portion 99 is supplied with the enable signal-180 and the internal clock CLK-180. Operation in FIG. 15B is identical with that shown in FIG. 15A.

Thus, an input signal A-0 in synchronism with the internal clock CLK-0 is outputted by the synchronous portion 97, and an inverted input signal A-180 (=/A) in synchronism with the internal clock CLK-180 is outputted by the synchronous portion 99.

Figure 16A:
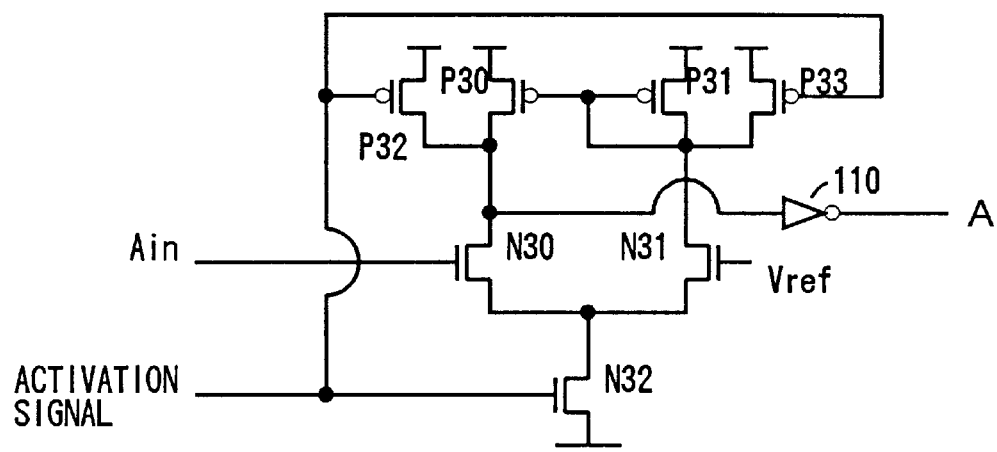
FIG. 16A is circuit diagram of one embodiment of an asynchronous input buffer.
Figure 16B:
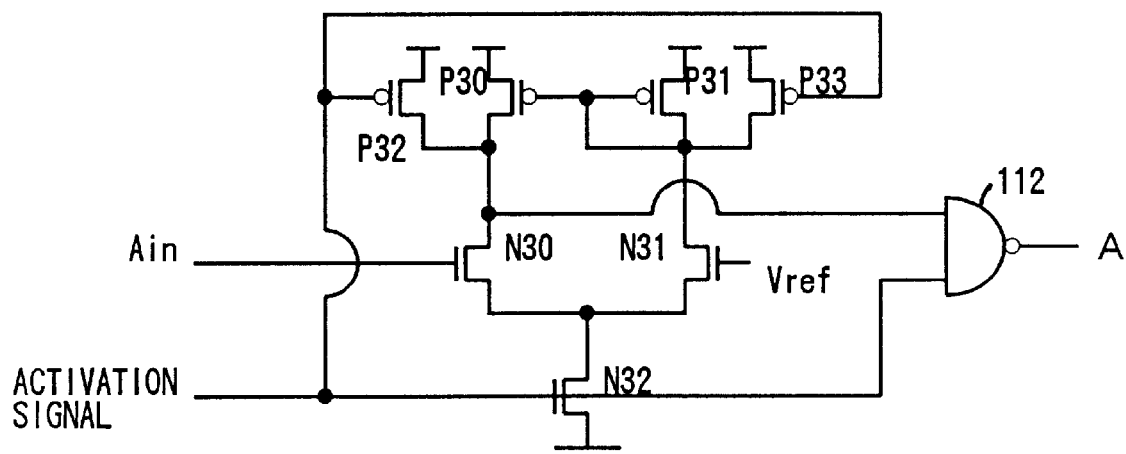
FIG. 16B is circuit diagram the embodiment of the asynchronous input buffer.

Next, FIGS. 16A and 16B are circuit diagrams of one embodiment of the asynchronous input buffers 50, 56 and 62. FIG. 16A shows a case where an output at the time of inactivation is maintained at the low level and FIG. 16B shows a case where an output at the time of activation is maintained at the high level.

As shown in FIG. 16A, the p-channel MOS transistors P30, P31, which constitute the current mirror, flow the direct current in the activated state so as to supply the power to the n-channel MOS transistors N30, N31, which constitute the differential circuit. In a case where the input buffers need to be inactivated, an activation signal is supplied to the p-channel MOS transistors P32, P33 and n-channel MOS transistor N32, so that these transistors are turned off and the power of these input buffers is thus intercepted. The activation signal is the power-down control signal in a case of the input buffers 50 and 62, or is an inverted power-down control signal in a case of the input buffer 56.

When the input enable signal is maintained at the high level, the input buffers compare the input signal Ain with the reference voltage Vref in the differential circuit so as to obtain a comparison result from the source of the MOS transistor N30 and output it via an inverter 110.

As shown in FIG. 16B, after the input signal Ain is compared with the reference voltage Vref in the differential circuit, the comparison result is obtained from the source of MOS transistor N30 and applied to an NAND gate 112. The NAND gate 112 carries out an NAND arithmetic for an activation signal and the comparison result so as to output an arithmetic result.

In this manner, the asynchronous input interface portion is externally supplied with the input signal and is inactivated by the input enable signal. Hence, the power consumption of the input interface portion can be reduced in the inactivation thereof.

Figure 17:
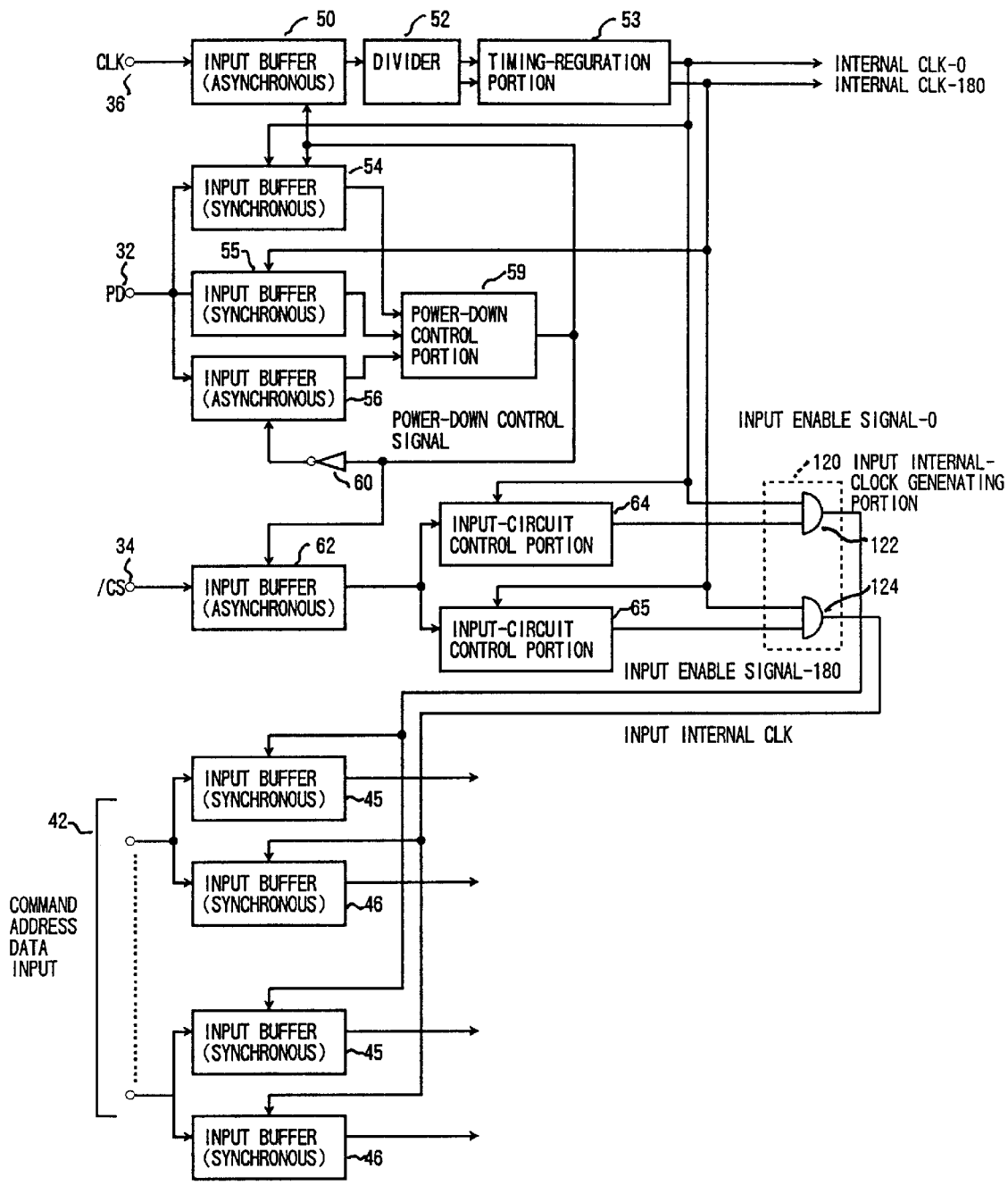
FIG. 17 is block diagram of a third embodiment of the semiconductor integrated circuit device according to the present invention.

FIG. 17 is a block diagram of a semiconductor integrated circuit device of a third embodiment according to the present invention. As shown in FIG. 17, parts that are the same as those shown in FIG. 8 are given the same reference numerals.

Unlike the second embodiment where the input internal-clock generators 80 are built in the asynchronous input buffers 45 and 46 of the input circuit 44, the third embodiment is provided with an input internal-clock generator 120 separately from the input buffers 45 and 46 instead.

As shown in FIG. 17, the input internal-clock generator 120 consists of an AND gates 122 and 124. The AND gate 122 is supplied with the internal clock CLK-0 and the input enable signal-0. When the input enable signal-0 is maintained at the high level, the AND gate 122 supplies the internal clock CLK-0 as the input internal-clock to the input buffer 45. On the other hand, the AND gate 124 is supplied with the internal clock CLK-180 and the input enable signal-180. When the input enable signal-180 is maintained at the high level, the AND gate 124 supplies the internal clock CLK-180 as the input internal-clock to the input buffer 46.

In this embodiment, it is not needed to provide the input internal-clock generators 80 for the respective input buffers 45 and 46, the number of which buffers being equal to the number of the bits of the input signal. Hence, the input circuit can be designed small.

The semiconductor integrated circuit device of the present invention has been described with respect to the SDRAM. The present invention is, however, not limited to the specifically disclosed embodiments about the SDRAM, and can be applicable to any semiconductor integrated circuit device where an output signal is outputted in synchronism with a signal inputted externally.

The above description is provided in order to enable any person skilled in the art to make and use the invention and sets forth the best mode contemplated by the inventions of carrying out their invention.

The present application is based on Japanese priority application No. 10-340555 filed on Nov. 30, 1998, the entire contents of which are hereby incorporated by reference.

What is claimed is:

1. A semiconductor integrated circuit device comprising:
   a power-down generating circuit generating a power-down control signal based on an external power-down signal which instructs power-down to the semiconductor integrated circuit;
   a clock generating circuit receiving an external clock and generating an internal clock, said clock generating circuit being inactivated in response to said power-down control signal;
   a chip select circuit generating an input enable signal in response to an external chip select signal, said chip select circuit being inactivated in response to said power-down control signal; and
   an input circuit inputting an external input signal in synchronism with said internal clock, based on said input enable signal,
   wherein said input circuit inputs said external input signal in synchronism with one of a rising edge and a falling edge of said internal clock, and further wherein said chip select circuit switches said input enable signal between an other of the rising edge and the falling edge of said internal clock and said one of the rising edge and the falling edge of the internal clock.

2. The semiconductor integrated circuit device as claimed in claim 1, wherein said input circuit includes an input internal-clock-generating portion which generates an input internal-clock from said internal clock and said input enable signal.

3. The semiconductor integrated circuit device as claimed in claim 1, wherein said input circuit includes an asynchronous input interface portion which is activated by said input enable signal and receives the external input signal.

4. The semiconductor integrated circuit device as claimed in claim 1, wherein:
   said clock generating circuit generates a first internal clock and a second internal clock which have a predetermined phase difference;
   said input circuit includes first and second input buffers which input said external input signal in synchronism with said first and second internal clocks, respectively; and
   said chip select circuit generates first and second input enable signals for activating said first and second input buffers, respectively, based on an external chip select signal.

5. The semiconductor integrated circuit device as claimed in claim 4, wherein:
   said first input buffer inputs said external input signal in synchronism with one of a rising edge and a falling edge of said first internal clock;
   said second input buffer inputs said external input signal in synchronism with one of a rising edge and a falling edge of said second internal clock;

said chip select circuit switches said first input enable signal between an other of the rising edge and the falling edge of said first internal clock and said one of the rising edge and the falling edge of said first internal clock; and said chip select circuit switches said second input enable signal between an other of the rising edge and the falling edge of said second internal clock and said one of the rising edge and the falling edge of said second internal clock.

6. The semiconductor integrated circuit device as claimed in claim 5, wherein:

said first input buffer generates a first input internal-clock from said first internal clock and said first input enable signal; and said second input buffer generates a second input internal-clock from said second internal clock and said second input enable signal.

7. The semiconductor integrated circuit device as claimed in claim 5, wherein each of said first and second input buffers includes an asynchronous input interface portion which is activated by a corresponding one of the first and second input enable signals and receives said external input signal.

8. The semiconductor integrated circuit device as claimed in claim 4, wherein said clock generating circuit includes a frequency divider which divides the frequency of the external clock and generates said first and said second internal clocks.

9. The semiconductor integrated circuit device as claimed in claim 4, wherein said clock generating circuit outputs two external complementary clocks as said first and said second internal clocks.

10. The semiconductor integrated circuit device as claimed in claim 4, wherein said clock generating circuit generates said first and second internal clocks by phase-shifting the external clock by 180°.

11. A semiconductor integrated circuit device comprising:

a power-down generating circuit generating a power-down control signal based on an external power-down signal which instructs power-down to the semiconductor integrated circuit;

a clock generating circuit, including a timing-regulation portion, receiving an external clock and generating an internal clock, said clock generating circuit being inactivated in response to said power-down control signal;

a chip select circuit generating an input enable signal in response to an external chip select signal, said chip select circuit being inactivated in response to said power-down control signal; and an input circuit inputting an external input signal in synchronism with said internal clock, based on said input enable signal, wherein said input circuit inputs said external input signal in synchronism with one of a rising edge and a falling edge of said internal clock, and further wherein said chip select circuit switches said input enable signal between an other of the rising edge and the falling edge of said internal clock and said one of the rising edge and the falling edge of the internal clock.

12. The semiconductor integrated circuit device as claimed in claim 11, wherein said timing-regulation portion includes a delay locked loop.

13. The semiconductor integrated circuit device as claimed in claim 11, wherein said input circuit includes a plurality of input buffers which receive a command signal, an address signal and a data signals as said external input signal.

14. A semiconductor integrated circuit device comprising:

a power-down generating circuit generating a power-down control signal based on an external power-down signal switch instructs power-down to the semiconductor integrated circuit;

a clock generating circuit receiving an external clock and generating an internal clock, said clock generating circuit being inactivated in response to said power-down control signal;

a chip select circuit generating an input enable signal in response to an external chip select signal, said chip select circuit being inactivated in response to said power-down control signal; and an input circuit inputting an external input signal in synchronism with said internal clock, based on said input enable signal, wherein said input circuit inputs said external input signal in synchronism with a transition of said internal clock from a first logic level to a second logic level which is different from the first logic level, and further wherein said chip select circuit switches a logic level of said input enable signal during the first logic level of said internal clock.

15. A semiconductor integrated circuit device comprising:

a power-down generating circuit generating a power-down control signal based on an external power-down signal which instructs power-down to the semiconductor integrated circuit;

a clock generating circuit, including a timing-regulation portion, receiving an external clock and generating an internal clock, said clock generating circuit being inactivated in response to said power-down control signal;

a chip select circuit generating an input enable signal in response to an external chip select signal, said chip select signal being inactivated in response to said power-down control signal; and an input circuit inputting an external input signal in synchronism with said internal clock, based on said input enable signal, wherein said input circuit inputs said external input signal in synchronism with a transition of said internal clock from a first logic level to a second logic level which is different from the first logic level, and further wherein said chip select circuit switches a logic level of said input enable signal during the first logic level of said internal clock.

* * * * *